United States Patent Office 3,508,332
Patented Apr. 28, 1970

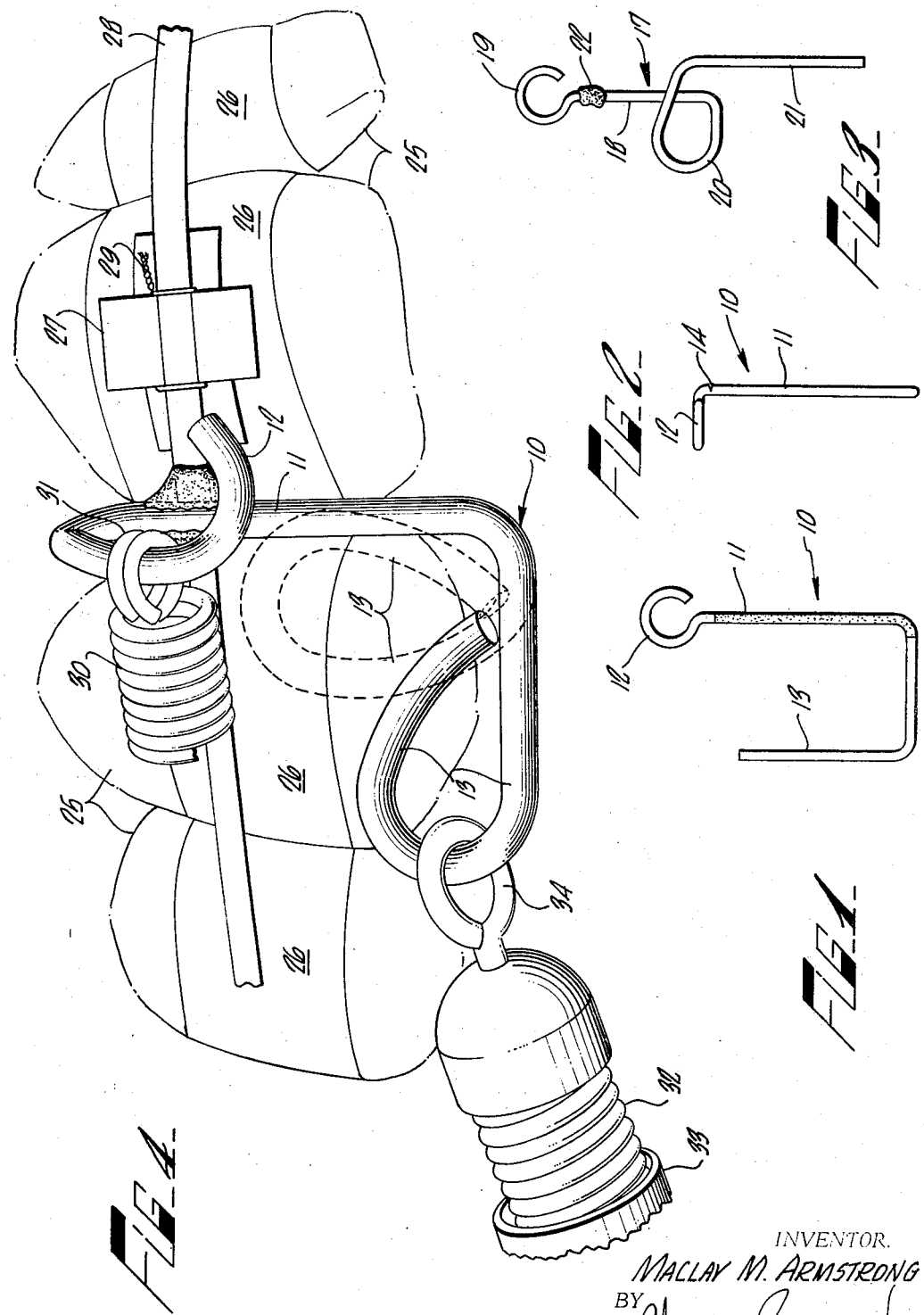

3,508,332
FORMABLE ORTHODONTIC HOOK
Maclay M. Armstrong, 1306 N. 175th, Suite 106,
Seattle, Wash. 98133
Filed Apr. 17, 1967, Ser. No. 631,429
Int. Cl. A61c 7/00
U.S. Cl. 32—14                    2 Claims

ABSTRACT OF THE DISCLOSURE

An orthodontic hook formed of stainless-steel wire and having a rigid center portion for attachment to an arch wire, and a pair of soft, formable end portions extending from opposite ends of the center portion. The end portions are readily bent into various loop configurations for engagement with orthodontic springs. Elongation of the springs is adjustable by varying the configuration of the loops formed by the end portions.

BACKGROUND OF THE INVENTION

This invention relates to a formable orthodontic hook for adjustably anchoring appliances such as coil springs used in various phases of orthodontic treatment. The hook finds its primary utility in the anchoring of intermaxillary or inter-arch·springs which extend between teeth in the upper and lower jaws to correct a malocclusion or other improper relation of the teeth in the opposed dental arches. The hook is also useful, however, to anchor intramaxillary or intra-arch springs which extend between teeth in the same jaw or dental arch. Intra-arch springs are typically used to close extraction gaps or to perform other major movements of a tooth or group of teeth in the same arch.

The hook of this invention is adapted for welding or silver soldering to an orthodontic arch wire, and provides several important advantages in the anchoring of springs or other appliances in a patient's mouth. The hook includes a rigid, stiff portion which is secured to and extends away from the arch wire to position the spring clear of the occlusal surfaces of the teeth. The rigid portion has sufficient stiffness to resist deforming forces imposed on it by the spring itself (especially when the spring is greatly elongated by large jaw separations as when the patient yawns or shouts), as well as forces occurring during the chewing of food or as may be imposed by improper brushing of the teeth. Proper positioning of the spring during an extended treatment period is thus provided by this deformation-resistant portion of the hook.

Another important advantage of this invention is that the hook includes a relatively long, soft and formable portion for engagement with the spring or other appliance. The formable portion is readily bent by the orthodontist to induce a desired amount of "activation" or initial elongation in the spring whereby the resulting restoring force of the spring acts to urge the malpositioned teeth toward a new position in the dental arch or arches. As the teeth move and the spring elongation accordingly decreases, re-activation or re-elongation of the spring is accomplished simply by bending the formable portion away from the spring end. The same spring can thus be used throughout the treatment period, and substitution of shorter springs is unnecessary to compensate for movement of the teeth in response to the corrective forces.

SUMMARY OF THE INVENTION

Briefly stated, the improved orthodontic hook of this invention is formed of a stainless-steel wire having a hard, rigid portion to be secured to an orthodontic arch wire, and having a soft, formable portion extending from the rigid portion. The formable portion is readily bent into loops of variable dimension, and the loops can be spaced at variable distances from the rigid portion to adjust the activation of an appliance coupled to the formable portion. Preferably, the hook is pre-formed in a generally U-shaped configuration.

In a presently preferred form of the invention, the hook is formed from a stainless-steel wire having a rigid center portion, and having a pair of soft, formable end portions extending from opposite ends of the center portion. One of the end portions is used to anchor an intramaxillary appliance, and the other end portion is used to anchor an intermaxillary appliance such as a coil spring. At least one of the formable portions is relatively long as compared to the rigid center portion to permit the formation of loops of variable spacing from the center portion whereby the activation of an appliance can be adjusted as orthodontic treatment progresses.

BRIEF DESCRIPTION OF THE DRAWINGS

The invention will be described in greater detail with reference to the attached drawings, in which:

FIG. 1 is an elevation of an orthodontic hook according to the invention;

FIG. 2 is a side view of the hook shown in FIG. 1 with an upper loop of the hook bent at right angles to a rigid center portion;

FIG. 3 is an elevation of an alternative form of the hook adapted for soldering to an arch wire; and FIG. 4 is a perspective view of the hook secured to an arch wire and engaged with a pair of orthodontic springs.

DESCRIPTION OF THE PREFERRED EMBODIMENTS

Referring to FIG. 1, an improved orthodontic hook 10 according to the invention is formed from a round stainless-steel wire of, say, 0.028 inch diameter. This wire material is normally supplied in a hard, tempered form, but selected portions of the wire are readily annealed to become soft and formable. Hook 10 includes a hard, rigid portion 11 (designated by stippling in FIG. 1) which retains the temper of the original material. A first formable portion 12 and a second formable portion 13 extend from opposite ends of rigid portion 11. The formable portions are treated by conventional heating techniques until these parts of the stainless-steel wire become soft and bendable.

Rigid portion 11 is straight along most of its length, and has a short, 90-degree bend at its lower end as viewed in FIG. 1. Formable portion 13 extends away from the lower end of the rigid portion and is then bent upwardly so the rigid portion and formable portion 13 form a generally U-shaped configuration having a pair of spaced-apart vertical arms and a horizontal connecting leg extending between the lower ends of the arms. First formable portion 12 extends from the upper end of the rigid portion and is formed into a circular loop.

As shown in FIG. 2, first formable portion 12 is preferably bent laterally or labially to extend perpendicularly from rigid portion 11. Preferably, a small nick or notch 14 is formed in the back of the upper end of the rigid portion to engage an orthodontic arch wire. This notch simplifies positioning of the hook on the arch wire when the hook and arch wire are to be secured together by electric welding. The configuration shown in FIGS. 1 and 2 is believed to be the most convenient form of the hook to be supplied to the orthodontist. This "pre-form" configuration is then reshaped by the orthodontist to meet the requirements of a particular treatment program after being secured to an orthodontic arch wire.

An alternative form of the invention is shown in FIG. 3, in which an orthodontic hook 17 includes a rigid portion 18 (formed just as rigid portion 11 described above), a first formable portion 19 extending from the upper end of the rigid portion, and a second formable portion 20 xtending from the lower end of the rigid portion. First formable portion 19 is shaped as a loop, and second formable portion 20 is also formed as a loop with a downwardly extending handle 21. A small mass of silver solder 22 is positioned at the upper end of the rigid portion.

Hook 17 is adapted for attachment to an orthodontic arch wire by conventional soldering techniques, and silver solder 22 guides the orthodontist in positioning the hook on the arch wire and insures proper tinning of the hook. Handle 21 is a convenient extension for holding the hook during the soldering operation, and the handle is clipped off by the orthodontist after soldering is complete. Hook 17 is otherwise used in the same manner as hook 10.

An installation of hook 10 is shown in FIG. 4 which illustrates several teeth 25 (shown in phantom) in the upper arch of a patient undergoing orthodontic treatment. Conventional tooth bands 26 have been cemented to the teeth, and each tooth band normally carries a conventional orthodontic bracket 27. Only one such bracket is shown in FIG. 4 to avoid unnecessary detail in the drawing.

A conventional orthodontic arch wire 28 extends around the dental arch of the patient and is secured in each orthodontic bracket by a conventional ligature wire 29. Hook 10 is secured to the arch wire between a pair of adjacent teeth by welding or soldering as described above.

In the treatment program illustrated in FIG. 4, a pair of orthodontic coil springs are being used to impose corrective forces on malpositioned teeth. A first coil spring 30 is disposed in an intra-arch configuration, for intramaxillary treatment, and is anchored at a terminal point (not shown) at the rear of the upper dental arch. The front end of spring 30 is formed into an eyelet 31, and first formable portion 12 of the hook is threaded through the eyelet and bent into a closed loop against the rigid portion of the hook. This closed loop can easily be opened at any time by the orthodontist should it become necessary to remove or replace coil spring 30. Formable portion 12 has been reshaped from the position shown in FIGS. 1 and 2 to fit snugly into the space available adjacent the arch wire and tooth bands. It is not always essential to bend portion 12 into a completely closed loop because intramaxillary springs are relatively static and do not require the same degree of anchoring required for an intermaxillary spring which is constantly elongated or "worked" as the lower jaw moves.

A second orthodontic coil spring 32 is housed in a sheath 33, and extends to a terminal point (not shown) on a posterior tooth in the lower arch. This spring is thus being used in an inter-arch or intermaxillary configuration, and delivers a corrective force between the upper and lower dental arches to correct an improper occlusal relationship between the teeth in these arches. Spring 32 includes an eyelet 34 at its forward end, and second formable portion 13 of hook 10 is threaded through eyelet 34 and bent back on itself to form a closed loop as shown in solid line in FIG. 4. The exact positioning of this loop is selected by the orthodontist to provide a desired degree of elongation or "activation" of spring 32.

As teeth in the upper and lower arches begin to move in response to the corrective force imposed by spring 32, the spring will contract and the corrective force will gradually decrease. The spring is re-activated to bring the corrective force back to a higher level by bending second formable portion 13 toward rigid portion 11 of the hook as suggested in phantom outline in FIG. 4. Portion 13 is relatively long in comparison to rigid portion 11 to permit a wide range of adjustment in the position of the loop which anchors eyelet 34 of spring 32.

The loop formed by portion 13 can, of course, be bent to a position intermediate the positions shown in solid and phantom outline in FIG. 4, and several stages of re-activation of the spring are thus possible. The orthodontist simply coils or rolls the loop toward the rigid portion to maintain the spring at any particular desired elongation as the treatment program progresses. The need for replacing spring 32 during the treatment program is thus often eliminated, and the same spring may be used throughout the program.

Bending portion 13 toward the rigid portion will typically provide about one-eighth inch of re-activation for the intermaxillary spring. Where more extensive movement of teeth is required, a second, shorter spring may be substituted after the original spring has accomplished initial movement. In this case, portion 13 is uncoiled back into the loop position shown in solid line in FIG. 4, and the second spring can then be re-activated by coiling the loop toward the rigid portion as additional tooth movement is accomplished. That is, portion 13 can be coiled and uncoiled through several cycles where several springs of progressively shorter length are required to accomplish major tooth movement.

There has been described an improved orthodontic hook having a pair of soft, formable portions which are readily formed into closable loops to anchor terminal ends of orthodontic coil springs. The hook is designed for economical manufacture by known production techniques, and is conveniently supplied to the orthodontist in a pre-formed configuration which requires minimum adjustment to fit the majority of treatment plans. While the preferred form described above includes a pair of soft formable portions, it is to be understood that the hook can be supplied with but a single formable portion shaped as a loop which can be rolled toward the rigid portion to permit re-activation of a coil-spring appliance. Other forms of the invention will suggest themselves to those skilled in the art, and all such forms are intended to fall.

I claim:
1. Orthodontic apparatus comprising:
an arch wire adapted for attachment to teeth;
a coil spring having first and second ends, the first end being adapted to be anchored intraorally; and
a hook formed by a wire having a hard rigid portion remote from the anchored end of the spring and secured to the arch wire, and having a soft formable portion extending from the rigid portion and readily bent into a loop of variable dimension spaced at a variable distance from the rigid portion, the spring being elongated and having its second end connected to the looped formable portion, the elongation of the spring being variable by bending the formable portion to vary the spacing of the second end from the rigid portion.

2. The apparatus defined in claim 1 in which the wire is stainless steel and the rigid portion is notched where it engages the arch wire.

References Cited

UNITED STATES PATENTS 1,044,764    11/1912    Federspiel     32—14
3,340,613    9/1967    De Weskin     32—14

ROBERT PESHOCK, Primary Examiner

PO-1050
(5/69)

UNITED STATES PATENT OFFICE
CERTIFICATE OF CORRECTION

Patent No. 3,508,332      Dated April 28, 1970

Inventor(s) Maclay M. Armstrong

It is certified that error appears in the above-identified patent and that said Letters Patent are hereby corrected as shown below:

Column 4, line 42, after "fall" insert --within the scope of the appended claims--

SIGNED AND
SEALED
SEP 15 1970

(SEAL)
Attest:

Edward M. Fletcher, Jr.
Attesting Officer

WILLIAM E. SCHUYLER, JR.
Commissioner of Patents